March 31, 1953  V. COLLINS  2,632,943
METHOD OF MAKING JOINTS BETWEEN LEAD AND BRASS PIPES
Filed Aug. 24, 1950
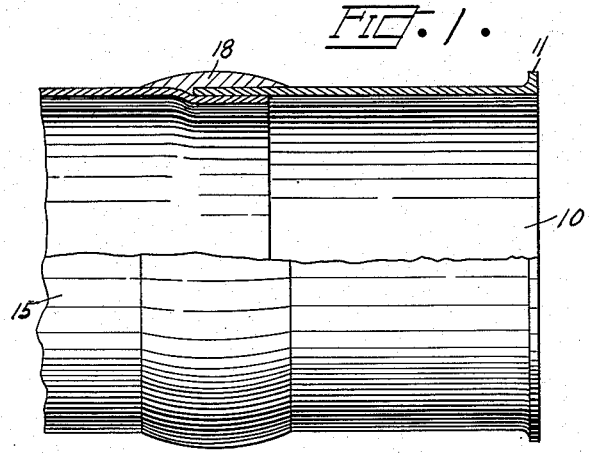
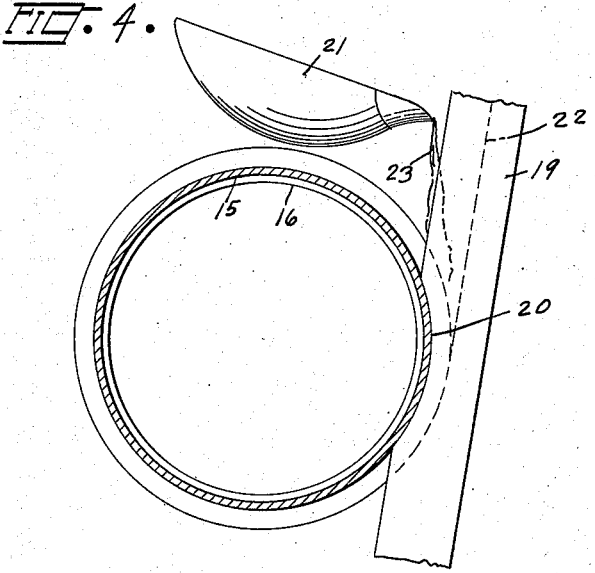
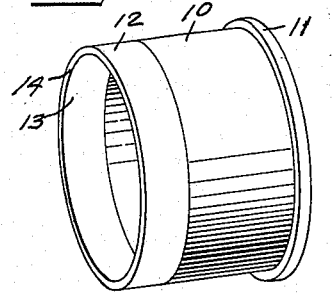
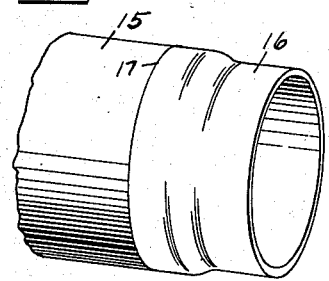
INVENTOR
VERN COLLINS
BY
ATTORNEY Patented Mar. 31, 1953

2,632,943

UNITED STATES PATENT OFFICE 2,632,943

METHOD OF MAKING JOINTS BETWEEN LEAD AND BRASS PIPES

Vern Collins, Salem, Oreg.

Application August 24, 1950, Serial No. 181,155

1 Claim. (Cl. 29—148.2)

This invention relates generally to the plumber's art and particularly to method of making a joint between a lead and brass pipe.

The main object of this invention is to provide a method of making a joint for lead and brass pipes and a method for forming the same without the expenditure of an objectionable amount of time.

The second object is to produce a perfect joint between lead and brass pipes without the necessity of exercising more than ordinary mechanical skill.

I accomplish these and other objects in the manner set forth in the following specification as illustrated in the accompanying drawing, in which:

Fig. 1 is a partial section through a brass ferrule and a portion of lead pipe showing the joint.

Fig. 2 is a perspective view of the brass ferrule showing the end thereof tinned.

Fig. 3 is a perspective view showing the reduced end of a lead pipe, the outer portion of which is tinned.

Fig. 4 is a transverse section through a lead pipe, showing the manner of wiping the joint thereon.

Like numbers of reference refer to the same or similar parts throughout the several views.

Referring in detail to the drawing, there is shown a brass ferrule 10 having an outturned flange 11 at one end, and having the portion 12 of its opposite end tinned on the outside and the portion 13 tinned on the inside, as well as on the uniting end surface 14.

The lead pipe 15 has a slightly reduced end 16 which is also tinned up to the line 17 which extends around the full diameter of the pipe 15.

There is also shown a joining material 18 which is a solder of suitable make-up.

In Fig. 4 is also shown a piece of cove molding 19, having a portion 20 cut away, as shown, to ride upon the outer surface of the ferrule 10 and the pipe 15.

A ladle 21 for molten solder is also indicated in a pouring position above the junction of the members 10 and 15, and the bottom line 22 of the molding 19.

In the production of this joint and the practice of the method, the following steps are taken: It is first necessary to shrink the end of the lead pipe 15 so that it can be inserted into the end of the brass ferrule 10. The exterior 12 and interior 13 of the ferrule 10 are tinned as is the exterior of the end 16 of the lead pipe 15.

The parts are now pre-heated to approximately 200° F., and revolved on their axes at about 60 R. P. M. A piece of cove molding 19 is now held in place and a few drops of solder are deposited on the location of the joint, this being enough to complete the tinning operation. The temperature of the parts is then raised to 600° F., and molten solder 23 is now poured from the ladle 21 between the wooden molding block 19 and the rotating pipe 15 and ferrule 10, thereby producing a smooth and thoroughly bonded joint 18 around both of the telescoping ends of the members 10 and 15 and uniting them with a joint of solder 18, as well as the tin joint between the surfaces 13 and the exterior of the end 16.

I claim:

A method of joining lead pipes to brass ferrules, consisting of first reducing the end of the lead pipe to telescope into said ferrule, then tinning the overlapped parts of the two members, then pre-heating the parts to approximately 200° F., then holding a cove molding in place against the side of the joint so that the cove in the molding will form the contour of the joint when finished, then raising the temperature of the parts to approximately 600° F., then pouring molten solder between the overlapped portions of said joint and the cove in said molding, and rotating said pipe so that its top side travels toward said molding and holds said molding approximately 10° from a vertical position.

VERN COLLINS.

REFERENCES CITED

The following references are of record in the file of this patent:

UNITED STATES PATENTS

| Number | Name | Date |
|---|---|---|
| 326,469 | Youngs | Sept. 15, 1885 |
| 517,611 | Gowing | Apr. 3, 1894 |
| 724,349 | Stanton | Mar. 31, 1903 |
| 1,280,311 | Scheeland | Oct. 1, 1918 |
| 1,256,599 | Schoop | Feb. 19, 1918 |
| 1,872,271 | Furrer | Aug. 16, 1932 |
| 2,428,823 | Wright | Oct. 14, 1947 |